(12) United States Patent
Yuan et al.

(10) Patent No.: US 12,298,649 B2
(45) Date of Patent: May 13, 2025

(54) OPTICAL DEVICE HAVING A MACH-ZEHNDER INTERFEROMETER WITH IMPROVED LINEARITY

(71) Applicant: HEWLETT PACKARD ENTERPRISE DEVELOPMENT LP, Spring, TX (US)

(72) Inventors: Yuan Yuan, Milpitas, CA (US); Stanley Cheung, Milpitas, CA (US); Yiwei Peng, Milpitas, CA (US); Zhihong Huang, Milpitas, CA (US); Marco Fiorentino, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 243 days.

(21) Appl. No.: 18/060,903

(22) Filed: Dec. 1, 2022

(65) Prior Publication Data

US 2024/0184180 A1 Jun. 6, 2024

(51) Int. Cl.
*G02F 1/225* (2006.01)
*G02F 1/21* (2006.01)

(52) U.S. Cl.
CPC ............. *G02F 1/225* (2013.01); *G02F 1/212* (2021.01); *G02F 2203/19* (2013.01)

(58) Field of Classification Search
CPC ....... G02F 1/225; G02F 1/212; G02F 2203/19
USPC .......................................................... 385/1–3
See application file for complete search history.

(56) References Cited

U.S. PATENT DOCUMENTS

| | | |
|---|---|---|
| 6,335,524 B1 | 1/2002 | Udd et al. |
| 8,401,398 B2 | 3/2013 | Robinson et al. |
| 8,457,453 B2 | 6/2013 | Lipson et al. |
| 8,655,114 B2 | 2/2014 | Popovic |
| 9,645,469 B2 * | 5/2017 | Lemaitre ............... G02F 1/2257 |
| 10,126,506 B2 | 11/2018 | Mower et al. |
| 10,345,674 B2 * | 7/2019 | Middlebrook ..... G02B 6/29338 |

(Continued)

FOREIGN PATENT DOCUMENTS

CN 113448135 A * 9/2021 ............. G02F 1/212

OTHER PUBLICATIONS

"Highly Linear Y-Fed Directional Coupler Modulator with Low Intermodulation Distortion" by Tavlykaev et al, Journal of Lightwave Technology, vol. 17, No. 2, pp. 282-291 (Year: 1999).*

(Continued)

*Primary Examiner* — Robert Tavlykaev
(74) *Attorney, Agent, or Firm* — Hewlett Packard Enterprise Patent Department

(57) ABSTRACT

Example optical devices having a Mach-Zehnder interferometer (MZI) with improved linearity are presented. An example optical device may include an MZI and a microring resonator (MRR) optically coupled to any one of a first optical waveguide arm or a second optical waveguide arm, where the MRR is operable in a resonance state and in an off-resonance state during operation of the optical device. The MZI includes a length difference between the first optical waveguide arm and the second optical waveguide arm thereby achieving a quarter-period phase delay between optical signals of the first optical waveguide arm and the second optical waveguide arm such that a superlinear transmission region of the microring resonator is aligned with peaks of an optical output of the MZI improving linearity of the optical output of the MZI.

20 Claims, 5 Drawing Sheets

(56) References Cited

U.S. PATENT DOCUMENTS

| | | | |
|---|---|---|---|
| 10,574,361 | B2 | 2/2020 | Pelc et al. |
| 11,209,677 | B1 | 12/2021 | Roxworthy et al. |
| 2017/0090268 | A1 | 3/2017 | O'Sullivan |
| 2020/0401012 | A1 | 12/2020 | Xu et al. |
| 2021/0278743 | A1 | 9/2021 | Huang et al. |

OTHER PUBLICATIONS

"Bandwidth of Linearized Ring Resonator Assisted Mach-Zehnder Modulator" by Tazawa et al, IEEE Photonics Technology Letters, vol. 17, No. 9, pp. 1851-1853 (Year: 2005).*

"Interferometric modulator with phase-modulating and cavity modulating components (IMPACC) for high linearity microwave applications: Technology Review" by Madamopoulos et al., Proc. of SPIE vol. 8883, paper 88830 (Year: 2013).*

Modulator With RF Gain by Van et al, Journal of Lightwave Technology, vol. 24, No. 4, pp. 1850-1854 (Year: 2006).*

Cardenas et al., "Linearized silicon modulator based on a ring assisted Mach Zehnder inteferometer", Optics Express, vol. 21, No. 19, 2013, 9 pages.

Cheng et al., "Silicon Photonics Codesign for Deep Learning", IEEE, 2020, pp. 1-23 pages.

Cheung et al., "Ultra-power-efficient heterogeneous III-V/Si MOSCAP (de-)interleavers for DWDM optical links", vol. 10, No. 2, Feb. 2022, 13 pages.

Ehrlichman el al., "Improved Digital-to-Analog Conversion Using Multi-Electrode Mach-Zehnder Interferometer", IEEE, 2008, pp. 3567-3575.

Shen el al., "Deep learning with coherent nanophotonic circuits", Nature photonics 11, No. 7 , 2017, 8 pages.

Xie et al., "Linearized Mach-Zehnder Intensity Modulator", IEEE Photonics Technology Letters, vol. 15, No. 4, Apr. 2003, 4 pages.

* cited by examiner

OPTICAL DEVICE HAVING A MACH-ZEHNDER INTERFEROMETER WITH IMPROVED LINEARITY

STATEMENT OF GOVERNMENT RIGHTS

This invention was made with Government support under Agreement Number H98230-18-3-0001. The Government has certain rights in the invention.

BACKGROUND

Optical devices such as Mach-Zehnder interferometers (MZIs) are widely used as basic building blocks for optical neural networks. An optical neural network implemented using the MZIs may include several neural network cells (e.g., comprising one or more MZIs) arranged in a Matrix. The optical neural networks often require these cells to be tuned several times during the training process of the optical neural networks by setting weights for respective MZIs. Generally, MZIs exhibit a sinusoidal transmission which may not be ideal for matrix weighing requiring complex circuitry and training logic.

BRIEF DESCRIPTION OF THE DRAWINGS

Various examples will be described below with references to the following figures.

Figure 1:
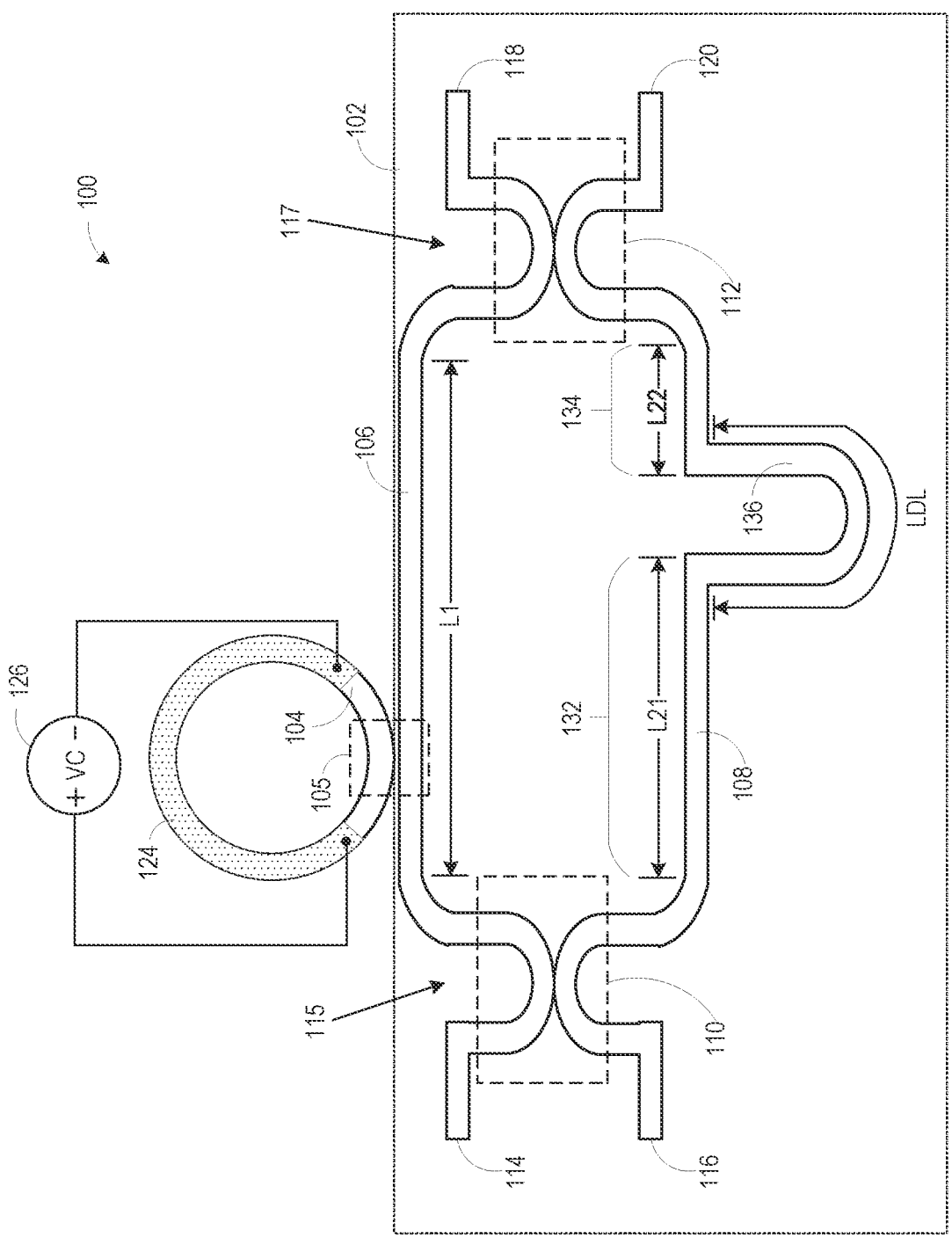
FIG. 1 depicts an example optical device.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical systems include optical devices that can generate, process, and/or carry optical signals from one point to another point. Artificial neural networks have proven remarkable capabilities in various tasks, including computer vision, speech recognition, machine translations, medical diagnoses, and gaming. A majority of the electrical artificial neural network hardware's energy consumption comes from data movement in the synaptic interconnections, for example, data movements between memory devices and processors. Optical neural networks, also known as photonic neural networks, are expected to improve energy efficiency and throughput significantly in comparison to electrical artificial neural networks due to their capabilities of transmitting data at the speed of light without having a length-dependent impedance.

Neuromorphic computing has shown significantly superior performance compared with traditional central processing units (CPUs) for specific neural network tasks. Optical interference allows efficient vector-matrix multiplication at the speed of light, which is a potential carrier for high-speed neuromorphic computing. As a quite common optical interference unit, an MZI is commonly used as a basic building block in optical neural networks. An optical neural network implemented using MZIs may include several neural network cells (e.g., comprising one or more MZIs) arranged in a Matrix.

Typically, an MZI includes two optical couplers and two waveguide arms allowing the propagation of light. In particular, an optical signal may be applied to an input of the MZI. Such input optical signal may be divided via an optical coupler and distributed into the two waveguide arms. The optical signals from both the optical waveguide arms of the MZI may be recombined via another optical coupler and exit via output ports of the MZI as a sinusoidal output. By changing the phase difference in the optical signals between the two waveguide arms, the transmission intensity of and/or the phase of sinusoidal output may be varied.

The MZIs implemented in an optical neural network are often tuned several times (e.g., several hundreds of times) during the training process of the optical neural network. This tuning entails encoding the output of the MZI. As it is apparent, the encoding of the sinusoidal output requires additional electronic control circuits such as a digital-to-analog converter to compensate for the nonlinearity of the sinusoidal output. In particular, in some implementations, a feedback circuit or a pre-calibrated look-up table may be used for each MZI in the optical neural network to aid in such encoding, which will significantly increase the system complexity, latency, and energy cost. Moreover, since electronic control circuits do not have extremely high precision, the sinusoidal output of the MZI may end up limiting the bit precision of each MZI and further restricting the training correctness of the entire optical neural network. Therefore, the sinusoidal transmission via the traditional MZIs may not be ideal for matrix weighing of the optical neural network requiring complex circuitry and training logic.

An existing solution attempted to minimize a nonlinearity in the output of an MZI to a certain extent. In particular, the existing solution used a ring resonator on each arm of the MZI. Further, the solution required the lengths of the two ring resonators to be odd multiples of the half-operating wavelength of the MZI to make them work in an off-resonance state, and selection of predetermined through-path ratios of the two ring resonators thereby generating phase delay between the optical waveguide arms sufficient to suppress third harmonic intensity distortion in the output of the MZI. The suppression of the third harmonic intensity distortion resulted in linearity improvement in a middle region (i.e., region of a signal except for the regions of the signal near the peaks of the signal) of the output of the MZI. However, the existing solution has been found inefficient in removing non-linearity near peaks of the output of the MZI which limits the encoding range and thus causes unnecessary optical energy loss.

In accordance with the examples presented herein, an enhanced optical device is presented that may overcome one or more of the challenges described hereinabove. The proposed optical device, in some examples, uses an MZI having a first optical waveguide arm and a second optical waveguide arm. In order to reduce the nonlinearity in the output of the MZI, the optical device may include an over-coupled microring resonator (MRR) that is optically coupled to one of the first optical waveguide arm or a second optical waveguide arm. Further, the examples presented in the present disclosure do not require any special design consideration for the MRR, unlike the existing solution which required the lengths of the two ring resonators to be odd multiples of the half-operating wavelength of the MZI to make them work in an off-resonance state.

Furthermore, the MRR implemented in the proposed optical device may operate in a resonance state as well as in an off-resonance state depending on the phase of an output optical signal of the MZI. The over-coupled MRR exhibits a superlinear response in the phase change when the optical signal is at resonance inside the MRR. In some examples, the first optical waveguide arm or the second optical waveguide arm are designed to achieve a quarter-period phase delay between the optical signals of the first optical waveguide arm and the second optical waveguide arm. Such a design of the first optical waveguide arm and the second optical waveguide arm causes the superlinear response of the MRR to overlap/align with the peaks of the output optical signal of the MZI, that is, the superlinear response of the MRR may be observed in a range of phase angles where the peaks of the output optical signal of the MZI appear. Such an alignment of the superlinear response of the MRR with the peaks of the output optical signal of the MZI cancels or minimizes the nonlinearity in the output optical signal of the MZI, by significantly reducing the nonlinearity near the peaks.

Further, in accordance with some examples, another optical device is presented that may also overcome one or more of the challenges described hereinabove. The proposed optical device, in some examples, also uses an MZI having a first optical waveguide arm and a second optical waveguide arm. In order to reduce the nonlinearity in the output of the MZI, the optical device may include an over-coupled MRR that is optically coupled to one of the first optical waveguide arm or the second optical waveguide arm. The MRR implemented in the proposed optical device may operate in a resonance state as well as in an off-resonance state depending on the phase of an output optical signal of the MZI. In some examples, the first optical waveguide arm or a second optical waveguide arm are designed such that the length difference between the first optical waveguide arm and the second optical waveguide arm is set based on an annular length of the MRR such that a superlinear transmission region of the MRR is aligned with peaks of an optical output of the MZI improving the linearity of the optical output of the MZI. In particular, in some examples, the length difference between the first optical waveguide arm and the second optical waveguide arm is set to half of the annular length of the MRR. Such a length ratio may ensure that a period of an MZI output is twice the period of the optical signal inside the MRR, thus the resonance inside the MRR coincides with "0" and "1" regions of the MZI sinusoidal output. Accordingly, the superlinear phase variation caused by the MRR cancels or minimizes the nonlinearity in the output optical signal of the MZI, by significantly reducing the nonlinearity near the peaks.

As will be appreciated, the proposed optical devices exhibit linear characteristics in the respective optical outputs. The linear regression standard errors of the proposed optical devices may be more than two times lower than the conventional MZIs, resulting in a 1 to 2 bits improvement in the bit precision compared to conventional MZI. Further, as will be appreciated, the higher bit precision simplifies the electronic control circuits, increases system energy efficiency, and improves the training correctness of the MZI-based optical neural networks. Further, the proposed optical devices may entail the use of one or two phase shifters (e.g., phase shifters) to control the phase of the optical signals in the MRR, which does not add much complexity compared to the conventional MZIs. Accordingly, the proposed optical devices may be more suitable for large-scale integration, such as MZI meshes. Further, the proposed optical devices are capable of being fabricated via standard photonics foundries because of their overall simple designs, and hence, have the potential to be low-cost and CMOS compatible.

Referring now to the drawings, in FIG. 1, an example optical device 100 having enhanced linearity is presented. The optical device 100 may find applications in optical neural network systems capable of storing and processing data in optical form, or in any optical communication system. One or more such optical devices may be implemented in the form of a photonic integrated circuit (see FIG. 5). In one example, such a photonic integrated circuit may be implemented in computers (stationary or portable), servers, storage systems, wireless access points, network switches, routers, docking stations, printers, or scanners. The optical device 100 of FIG. 1 may include a Mach-Zehnder interferometer (MZI) 102 and a microring resonator (MRR) 104 formed adjacent to the MZI 102 and optically coupled to the MZI 102.

The MZI 102 may include a pair of optical waveguide arms, for example, a first optical waveguide arm 106 and a second optical waveguide arm 108; and a pair of optical couplers 110 and 112. In particular, the first optical waveguide arm 106 and a second optical waveguide arm 108 are connected to each other at a first end 115 via the optical coupler 110, at a second end 117 via the optical coupler 112, as depicted in FIG. 1. The optical couplers 110 and 112 may be operated as input coupler and output coupler, respectively. Accordingly, the optical couplers 110 and 112 are hereinafter also referred to as an input coupler 110 and an output coupler 112, respectively. Each of the optical waveguide arms 106, 108 and the optical couplers 110, 112 have a waveguide to allow propagation of the optical signals (e.g., light) therethrough during the operation of the optical device 100.

The input coupler 110 may have optical input ports 114 and 116, and the output coupler 112 may have output ports 118 and 120. An optical signal may be supplied to any of the input ports 114 and 116, and an optical output of the optical device 100 may be obtained from any of the output ports 118 and 120. For the purpose of illustration hereinafter, an optical signal may be considered as applied to the input port 114 and the optical output may be measured at the output port 118. In some examples, the MZI 102 is designed such that there may exist a phase difference of $\pi/2$ between the optical signals appearing at the output ports 118 and 120.

During operation, an optical signal may be applied to the input port 114 of the MZI 102. The input optical signal may be divided into two light streams via the input coupler 110 and distributed into the two waveguide arms 106 and 108. The optical signals from both the optical waveguide arms 106 and 108 of the MZI 102 may be recombined and again divided into two optical output streams and exit via output ports 118 and 120. By changing the phase difference in the optical signals propagating in the two waveguide arms, the transmission intensity of and/or the phases of the optical output at the output ports 118 and 120 may be varied.

Further in some examples, in order to improve the linearity in the optical output of the MZI 102, the optical device 100 includes the MRR 104. For illustration purposes, in FIG. 1, the MRR 104 is shown to have a ring shape. However, in some other examples, the MRR 104 may also be formed to have a loop of any shape (e.g., circular loop, oval loop, rounded rectangle loop, rounded square loop, rounded triangle loop, etc.), within the purview of the present disclosure. In some examples, an MRR having a loop shape that is elongated to have a straight section along one direction (e.g., racetrack-shaped or elongated oval-shaped) is also envisioned within the purview of the present disclosure. In some examples, the MRR 104 may be created by forming an annular waveguide, hereinafter referred to as an MRR cavity, in a device layer (e.g., made of Silicon) of a semiconductor substrate (e.g., a silicon on insulator substrate. In particular, in some examples, an oxide layer may be formed on top of the MRR cavity. Further, a buffer layer (e.g., made of III-V material) may be formed on top of the oxide layer using techniques such as, but not limited to, deposition, wafer bonding, monolithic growth, or other fabrication techniques. Examples of the III-V materials that may be used to form the buffer layer may include, GaAs, Gallium nitride (GaN), Indium nitride (InN), or combinations thereof.

The MRR 104 may be optically coupled to any one of the two waveguide arms of the MZI 102. In some examples, the MRR 104 may be optically coupled to a shorter of the first optical waveguide arm 106 and the second optical waveguide arm 108. In the present implementation, for illustration purposes, the MRR 104 is shown as optically coupled to the first waveguide arm 106. The term "optically coupled" or "optical coupling" as used herein may refer to the relative positioning of two optical components (e.g., the MRR 104 and the first optical waveguide arm 106, in this case) that allow evanescent coupling of light between the two optical components. In particular, a region 105 marked with a dashed box represents a coupler, hereinafter referred to as bus-ring coupler 105, which enables evanescent coupling of light between the optical waveguide arm 106 and the MRR 104. In particular, the MRR 104 is formed such that a coupling coefficient of the bus-ring coupler 105 between the MRR 104 and the first optical waveguide arm 106 of the MZI 102 is greater than the optical losses incurred inside the MRR 104. With such a positioning of the MRR and the MZI 102, the MRR 104 is said to be over-coupled with the MZI 102.

In particular, during the operation of the optical device 100 when an optical signal is supplied to the input port 114, the MRR 104 may operate in a resonance state or an off-resonance state depending on the wavelength and the phase of the optical signal. In particular, the resonance state is a state of the MRR 104 when a particular wavelength resonates within the MRR 104 and causes increased optical loss within the MRR 104. Whereas the off-resonance state is a state of the MRR 104 when the light does not resonate inside the MRR 104 causing no or reduced optical loss inside the MRR 104 compared to the off-resonance state. In particular, examples presented herein do not require any special design consideration like that of the known solution which requires the lengths of the ring resonators to be odd multiples of the half-operating wavelength of the MZI to make them work in an off-resonance state only. On the contrary, the MRR 104 may operate in the resonance state, the off-resonance state, or any state between the resonance state and the off-resonance state. Typically, an over-coupled MRR exhibits a superlinear change in phase near the resonance (for a range of wavelengths near the resonant wavelength of the MRR). A range of wavelengths for which the MRR 104 exhibits a superlinear change in phase is hereinafter referred to as a superlinear phase region of the MRR 104.

The example optical device 100 of the present disclosure utilizes the superlinear phase variations to compensate for nonlinearities in the optical output of the MZI near the peaks (i.e., maxima and minima of the optical signal output for the MZI 102). In particular, the over-coupled MRR 104 provides a more pronounced phase change in a low slope response region (i.e., region of the optical output near the peaks) removing or reducing the nonlinearities in the optical output near the peaks thereby making the optical output more linear compared to a typical MZI.

To cause the superlinear phase variations of the MRR 104 to compensate for the nonlinearities in the optical output, the superlinear phase region of the MRR 104 may be aligned at or about the peaks of the optical output of the MZI 102. In some examples, this is achieved at least in part by choosing the relative dimensions of the optical waveguide arms 106 and 108. In particular, the optical waveguide arms 106 and 108 may be formed in such a way that there exists a quarter-period phase delay (e.g., a phase difference of $\pi/2$) between the optical signals in the first optical waveguide arm 106 and the second optical waveguide arm 108. In one example, to achieve the quarter-period phase delay between the optical signals in the optical waveguide arms 106 and 108, the optical waveguide arms 106 and 108 may be designed to have a length difference of ($\Delta L_{MZI}$) between them.

In the example implementation of FIG. 1, the length of the first optical waveguide arm 106 is shown as L1. Further, the second optical waveguide arm 108 may have a first section 132, a second section 134, and a delay section 136 (e.g., a U-shaped section) having lengths L21, LDL, and L22. Accordingly, a total length L2 of the second optical waveguide arm may be equal to a sum of the lengths L21, LDL, and L22. A difference between the lengths L1 and L2 may be hereinafter referred to as a length difference $\Delta L_{MZI}$. In some examples, the second optical waveguide arm 108 may be formed such that the L2 of the second optical waveguide arm 108 is greater than the length L1 of the first optical waveguide arm 106 by $\Delta L_{MZI}$. In particular, in some examples, the lengths L1 and L21, LDL, and L22 are designed such that the length difference of ($\Delta L_{MZI}$) will introduce the quarter-period phase delay between the optical signals in the optical waveguide arms 106 and 108. In particular, the length difference of ($\Delta L_{MZI}$) between the optical waveguide arms 106 and 108 may be set to a value determined by an example equation (1) to cause the quarter-period phase delay between the optical signals in the optical waveguide arms 106 and 108.

$$\Delta L_{MZI} = \frac{(2m+1)\lambda}{4n_{MZI}} \quad \text{Equation (1)}$$

where λ is an operating wavelength of the MZI 102, $n_{MZI}$ is a refractive index of the optical waveguide arms 106, 108 of the MZI 102, and m is any integer value (e.g., 0, 1, 2, 3, . . . and so on).

Further, in some examples, the optical device 100 of FIG. 1 may include a phase shifter 124 formed along a portion of the MRR 104 to adjust the phase of the optical signal inside the MRR 104. Further, a power source 126 may be connected to phase shifter 124 to supply voltage and/or current to the phase shifter 124. In one example, the phase shifter 124 may be a heater, Microelectromechanical system (MEMS), metal-oxide-semiconductor (MOS)-capacitor, P-I-N junction, P-N junction, or combinations thereof. For the purpose of illustration hereinafter, the phase shifter 124 is described as being a metal heater formed over the MRR cavity. When a voltage is applied to the phase shifter 124, the phase shifter 124 generates heat which changes material properties locally inside the MRR 104. Such change in the material property causes a change in the refractive index ($\Delta n_{MRR}$) of the MRR 104 which in turn causes a change in the phase of the optical signal inside the MRR 104. A change in the phase of the optical signal inside the MRR 104 caused due to the applied phase shifter voltage is hereinafter referred to as an MRR-induced phase ($\phi_r$). The MRR-induced phase change may be determined using the example equation (2).

$$\phi_r = \frac{(n_{MRR} + \Delta n_{MRR}) \times 2\pi}{\lambda} L_r \quad \text{Equation (2)}$$

wherein λ is the operating wavelength of the MZI 102 and $n_{MRR}$ is a refractive index of the MRR 104.

The MRR-induced phase change ($\phi_r$) can be adjusted by varying the voltage applied to the phase shifter 124 to encode the MZI output.

Figure 2:
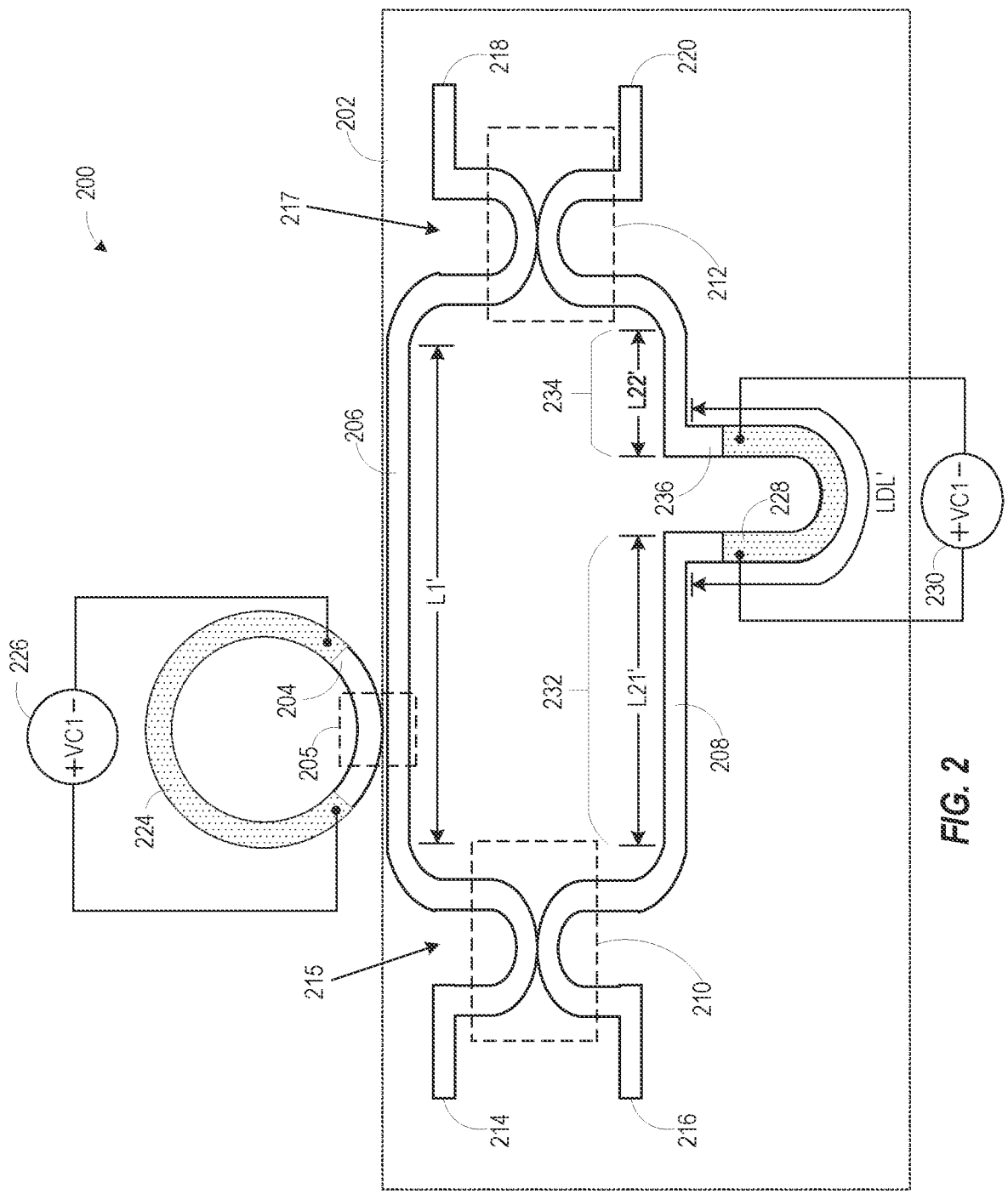
FIG. 2 depicts another example optical device.

Referring now to FIG. 2, another example optical device 200 having enhanced linearity is presented. The optical device 200 may be an example representative of the optical device 100 of FIG. 1. Accordingly, certain aspects described in conjunction with FIG. 1 have not been described in detail with reference to FIG. 2. For example, the optical device 200 of FIG. 2 also includes an MZI 202 and the MRR 204 which are example representatives of the MZI 102 and the MRR 104 described in FIG. 1 with additional design considerations, as will be described later.

The MZI 202 may include a pair of optical waveguide arms, for example, a first optical waveguide arm 206 and a second optical waveguide arm 208; and a pair of optical couplers, for example, an input coupler 210 and an output coupler 212. In particular, the first optical waveguide arm 206 and the second optical waveguide arm 208 are connected to each other at a first end 215 via the optical coupler 210, at a second end 217 via the optical coupler 212, as depicted in FIG. 2. Each of the optical waveguide arms 206, 208 and the optical couplers 210, 212 have a waveguide to allow propagation of the optical signals (e.g., light) therethrough during the operation of the optical device 200. During operation, an input optical signal may be supplied to any of input ports 214, 216, and optical output may be obtained via output ports 218, 220.

Further, in order to improve the linearity in the optical output of the MZI 202, the optical device 200 includes the MRR 204. For illustration purposes, in FIG. 1, the MRR 204 is shown to have a ring shape. However, in some other examples, the MRR 204 may also be formed to have a loop of any shape described in conjunction with FIG. 1, within the purview of the present disclosure. Further, the MRR 204 may be optically coupled to any one of the two waveguide arms of the MZI 202. In an example implementation, the MRR 204 is optically coupled to a shorter of the two optical waveguide arms 206 and 208. In the present implementation, for illustration purposes, the MRR 204 is shown as optically coupled along a bus-ring coupler 205 to the first waveguide arm 106 (which is the shorter of the two optical waveguide arms 206 and 208). In particular, the MRR 204 may be over-coupled to the first waveguide arm 106 and exhibit a superlinear change in phase. Also, similar to the MRR 104, the MRR 204 may also operate in a resonance state or an off-resonance state depending on the wavelength and the phase of the optical signal.

Like the optical device 100 of FIG. 1, the example optical device 200 of FIG. 2 also causes the superlinear phase variations of the MRR 104 to compensate for nonlinearities in the optical output of the MZI 202 near the peaks (i.e., maxima and minima of the optical signal output for the MZI 202). In particular, the over-coupled MRR 204 provides a more pronounced phase change in a low slope response region (i.e., region of the optical output near the peaks) removing or reducing the nonlinearities in the optical output near the peaks thereby making the optical output more linear compared to typical MZIs. To cause the superlinear phase variations of the MRR 204 to compensate for the nonlinearities in the optical output, the superlinear phase region of the MRR 204 is aligned at or about the peaks of the optical output of the MZI 202. In some examples, this is achieved at least in part by choosing the relative dimensions of the optical waveguide arms 206 and 208 and the MRR 204. In the example implementation of FIG. 2.

In the example implementation of FIG. 2, the length of the first optical waveguide arm 206 is shown as L1'. Further, the second optical waveguide arm 208 may have a first section 232, a second section 234, and a delay section 236 (e.g., a U-shaped section) having lengths L21', LDL', and L22'. Accordingly, a total length L2' of the second optical waveguide arm may be equal to a sum of the lengths L21', LDL', and L22'. A difference between the lengths L1' and L2' may be hereinafter referred to as a length difference $\Delta L'_{MZI}$. In particular, in some examples, the lengths L1' and L21', LDL', and L22' and a ring length Lr are designed such that the length difference of ($\Delta L'_{MZI}$) will cause the superlinear phase region of the MRR 204 to be aligned at or about the peaks of the optical output of the MZI 202. In particular, the length difference of ($\Delta L'_{MZI}$) between the optical waveguide arms 106 and 108 may be set to a value determined by an example equation (3) to align the superlinear phase region of the MRR 204 at or about the peaks of the optical output of the MZI 202.

$$\Delta L_{MZI} = \frac{Lr}{2} \qquad \text{Equation (3)}$$

Further, in some examples, the optical device 200 may include phase shifters 224 and 228. In the description hereinafter, the phase shifters 224 and 228 are described as being metal plates formed over the MRR 204 and the U-shaped section of the second optical waveguide arm 208, respectively. In some other examples, the phase shifters 224 and 228 may as well be MEMSs, MOS-capacitors, P-I-N junctions, P-N junctions, or combinations thereof. In particular, the phase shifter 224 may be formed along a portion of the MRR 204 to adjust a phase of the optical signal inside the MRR 204 based on the voltage applied to the phase shifter 224 via a first power source 226. Furthermore, the phase shifter 228 may be formed along a portion of the second optical waveguide arm 208. In particular, as depicted in FIG. 2, the phase shifter 228 may be formed along the delay section 236 of the second optical waveguide arm 208 and is connected to a second voltage source 230 to receive power to induce a phase change in the optical signal inside the second optical waveguide arm 208.

When a voltage is applied to the phase shifter 224 via the first power source 226, the phase shifter 224 causes a change in the refractive index ($\Delta n'_{MRR}$) of the MRR 204 which in turn causes a change in the phase of the optical signal inside the MRR 204. Such change in the phase of the optical signal inside the MRR 204 caused due to the applied phase shifter voltage is hereinafter referred to as an MRR-induced phase ($\phi'_r$). The MRR-induced phase change ($\phi'_r$) can be adjusted to finetune the alignment of the superlinear phase region of the MRR 204 with the peaks of the optical output of the MZI 202. The MRR-induced phase change may be determined using the example equation (4).

$$\phi'_r = \frac{(n'_{MRR} + \Delta n'_{MRR})2\pi}{\lambda} \times Lr \qquad \text{Equation (4)}$$

wherein $\lambda$ is the operating wavelength of the MZI 202 and $n'_{MRR}$ is a refractive index of the MRR 204.

Similarly, when a voltage is applied to the phase shifter 228 via the second power source 230, the phase shifter 228 causes a change in the refractive index ($\Delta n_{MZI}$) of the delay section 236 of the second optical waveguide arm 208 which in turn causes a change in the phase of the optical signal inside the optical waveguide arm 208. Such change in the phase of the optical signal inside the optical waveguide arm 208 caused due to the applied phase shifter voltage is hereinafter referred to as an MZI arm induced phase ($\theta$). The MZI arm induced phase change ($\theta$) may also be adjusted to finetune the alignment of the superlinear phase region of the MRR 204 with the peaks of the optical output of the MZI 202. The MZI arm induced phase change may be determined using the example equation (5).

$$\theta = \frac{(n_{MZI} + \Delta n_{MZI})2\pi}{\lambda} \times \frac{Lr}{2} \qquad \text{Equation (5)}$$

wherein $\lambda$ is the operating wavelength of the MZI 202 and $n_{MZI}$ is a refractive index of the MZI 202.

In some examples, voltages applied via both the power sources 226 and 230 may be simultaneously varied to adjust the alignment of the superlinear phase region of the MRR 204 with the peaks of the optical output of the MZI 202, thereby removing or minimizing the nonlinearities in the optical output of the MZI 202.

As will be appreciated, the proposed optical devices, for example, the optical devices 100 and 200, exhibit linear characteristics in the respective optical output. The linear regression standard deviations of the proposed optical devices 100 and 200 may be more than two times lower compared to those of a conventional MZI, resulting in a one-to two-bit improvement in the bit precision compared to the conventional MZI. Further, as will be appreciated, the higher bit precision simplifies the electronic control circuits, increases system energy efficiency, and improves the training correctness of the MZI-based optical neural networks. Furthermore, the proposed optical devices 100 and 200 may entail the use of one or two phase shifters (e.g., the phase shifter 124 or the phase shifters 224 and 228) to control the phase of the optical signals in the MRR, which does not add much complexity compared to the conventional MZI. Accordingly, the proposed optical devices 100 and 200 may be more suitable for large-scale integration, such as MZI meshes. Further, the proposed optical devices 100 and 200 are capable of fabricating via standard photonics foundries because of their overall simple designs, and hence, have the potential to be low-cost and CMOS compatible.

Figure 3A:
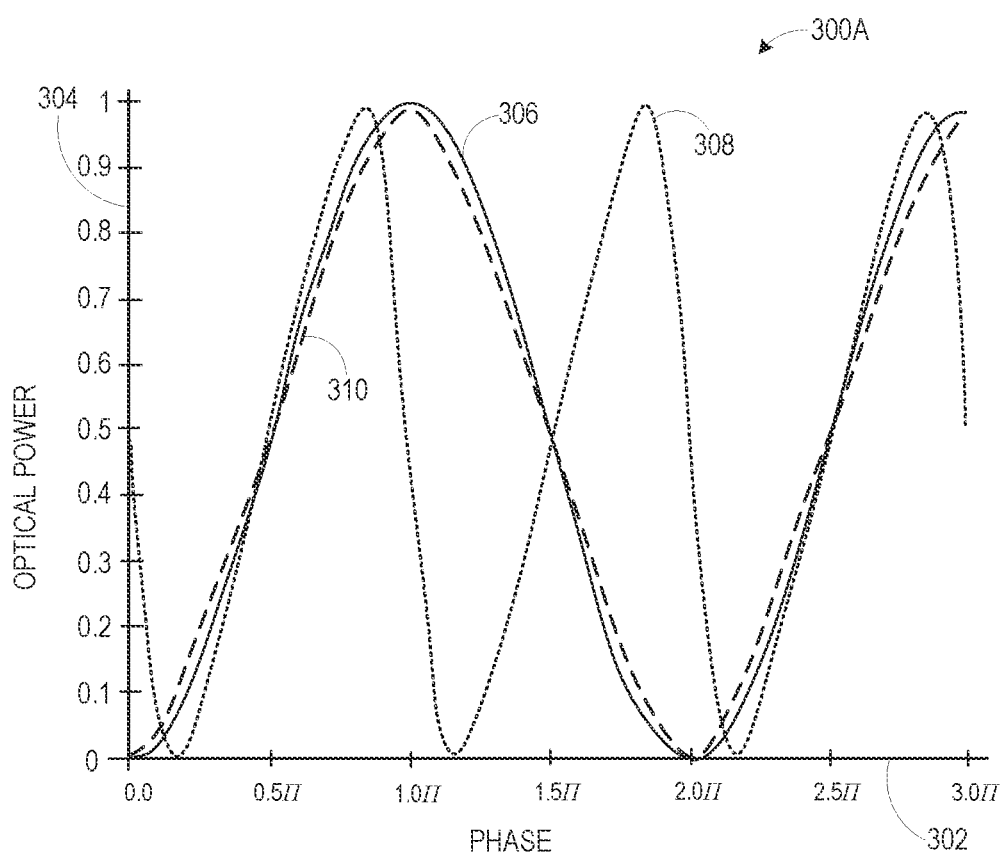
FIG. 3A depicts a graphical representation showing a comparison between calculated output powers of the example optical devices and an optical power output of a conventional MZI.
Figure 3B:
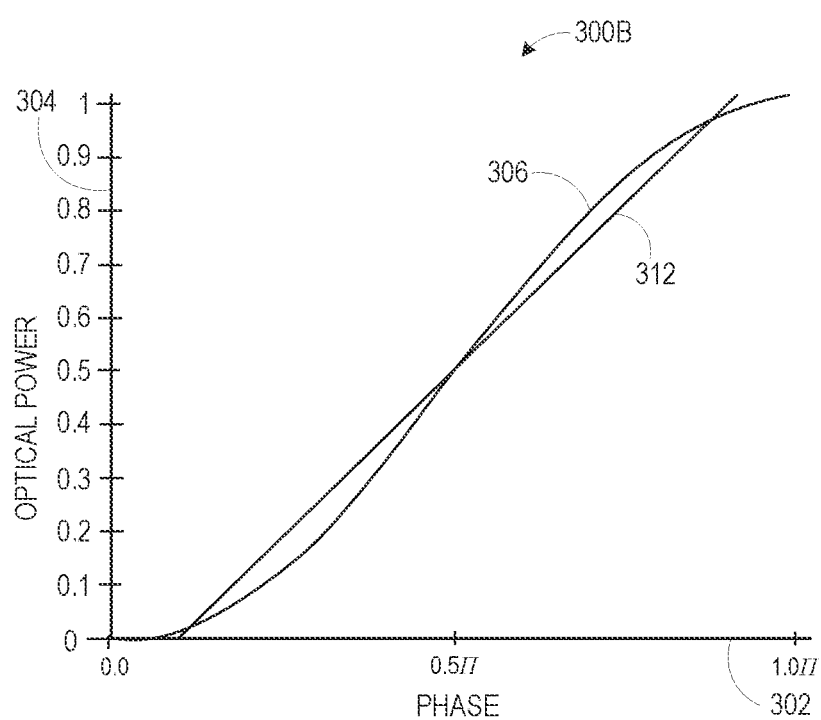
FIG. 3B depicts a graphical representation illustrating a deviation of an optical power output of a conventional MZI from a liner output.
Figure 3C:
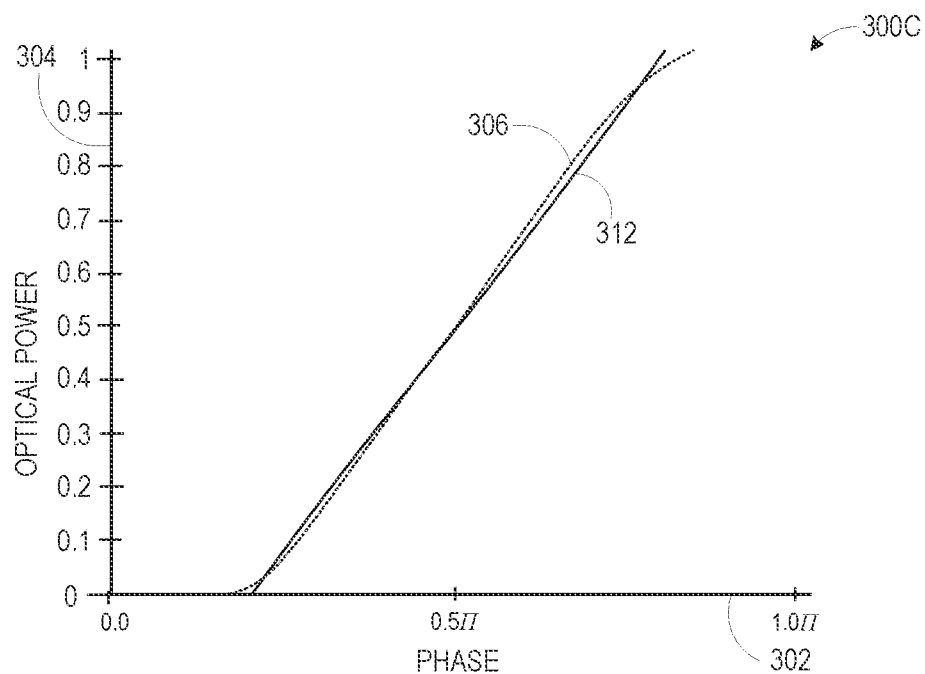
FIG. 3C depicts a graphical representation showing a deviation of a calculated optical power output of an example optical device from a liner output.
Figure 3D:
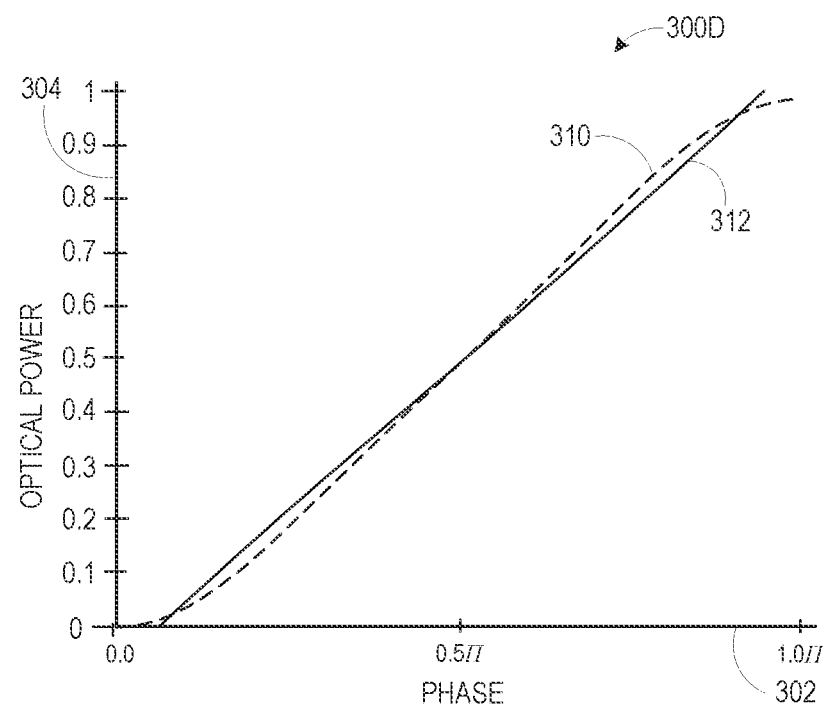
FIG. 3D depicts a graphical representation showing a deviation of a calculated optical power output of another example optical device from a liner output.

FIGS. 3A, 3B, 3C, and 3D respectively depict example graphical representations 300A, 300B, 300C, and 300D showing a comparison of optical powers to illustrate the improvement in linearity of the proposed example optical devices. For ease of illustration hereinafter, FIGS. 3A-3D will be referenced concurrently. In particular, the graphical representation 300A of FIG. 3A depicts a comparison of calculated output optical powers of the example optical devices 100 and 200 with an optical power output of a conventional MZI. Further, the graphical representation 300B of FIG. 3B depicts a comparison between the output optical power of the conventional MZI with a liner response. Furthermore, the graphical representation 300C of FIG. 3C depicts a comparison between the calculated output optical power of the optical device 100 of FIG. 1 with the liner response. Moreover, the graphical representation 300D of FIG. 3D depicts a comparison between the calculated output optical power of the optical device 200 of FIG. 2 with the liner response. In particular, in the graphical representations 300A-300D, an X-axis 302 represents phase angle in radians, and a Y-axis 304 represents a normalized optical power at an output port, for example, the output port 118 in case of FIG. 1 and the output port 218 in case of FIG. 2. On the Y-axis 304, a value of 1 (one) represents maximum optical power and a value of 0 (zero) represents non-detectable or no optical power. It is to be noted that, in the graphical representations 300B, 300C, and 300D, the X-axis 302 shows finer values compared to the graphical representation 300A.

Since both the optical devices 100 and 200 include two directional couplers (e.g., the optical couplers 110 and 112 in the optical device 100, and the optical couplers 210 and 212 in the optical device 200) and one MRR (e.g., the MRR 104 in the optical device 100, and the MRR 204 in the optical device 200), an output electric field at the respective output ports may be expressed using Equation (6).

$$\begin{bmatrix} E_{o1} \\ E_{o2} \end{bmatrix} = \begin{bmatrix} \sqrt{1-\varepsilon^2} & j\varepsilon \\ j\varepsilon & \sqrt{1-\varepsilon^2} \end{bmatrix}$$

$$\begin{bmatrix} \exp(j(\pi+\phi_r))\dfrac{a-t\exp(-j\phi_r)}{1-at\exp(j\phi_r)} & 0 \\ 0 & \exp(j\theta) \end{bmatrix}$$

$$\begin{bmatrix} \sqrt{1-\varepsilon^2} & j\varepsilon \\ j\varepsilon & \sqrt{1-\varepsilon^2} \end{bmatrix} \begin{bmatrix} E_{i1} \\ E_{i2} \end{bmatrix}$$

Equation (6)

Where $E_{o1}$ represents an electric field at a first output port (e.g., the output port 118 in case of optical device 100 or the output port 218 in case of optical device 200), $E_{o2}$ represents electric field at a second output port (e.g., the output port 120 in case of optical device 100 or the output port 220 in case of optical device 200), E is the field coupling factor of the optical couplers, a is the roundtrip field transmission of the respective MRR (e.g., the MRR 104 in case of optical device 100 or the MRR 204 in case of optical device 200),), and t is the field transmission coefficient of the respective bus-ring coupler (e.g., the bus-ring coupler 105 or 205). For the purpose of illustration, both optical couplers of the respective MZI are designed to be 50%-50% couplers (i.e., the couplers are designed to transmit half of the input optical power into each of two optical waveguide arms of the MZI), which means $\vec{\varepsilon} = 0.5$. By optimizing the field coupling coefficient of the bus-ring coupler, κ, the output optical power of the respective MZIs can be linearized. Further, for the MRRs 104 and 204 being all-pass rings, $\kappa^2+t^2=1$.

The calculated output power for a conventional MZI is represented using a solid line curve 306 in FIGS. 3A and 3B. Also, the calculated output power of the optical device 100 is represented using a dotted line curve 308 in FIGS. 3A and 3C. Similarly, the calculated output power of the optical device 200 is represented using a dashed line curve 310 in FIGS. 3A and 3D.

In particular, for the optical device 100 of FIG. 1, values of a and κ are respectively set to 0.99 and 0.96 for the calculation of the output power. Further, for the optical device 200 of FIG. 2, values of α and κ are respectively set to 0.99 and 0.998 for the calculation of the output power. To quantify the linearity of the output powers a linear regression of respective output powers is performed from "0" to "1" and the results are plotted in the graphical representations 300A-300D in the form of curved lines 306, 308, and 310. Based on the linear regression of output powers depicted in FIGS. 3B, the standard deviation (a) between the output power of the conventional MZI from a linear response 312 is determined to be about 0.0431. Further, as depicted in FIG. 3C, the standard deviation (σ1) between the output power of the optical device 100 and the linear response 312 is determined to be about 0.0175, which is more than two times lower than that of the conventional MZI (σ=0.0431). Similarly, as depicted in FIG. 3D, the standard deviation (σ2) between the output power of the optical device 200 and the linear response 312 is determined to be about 0.021, which is also more than two times lower than that of the conventional MZI (σ=0.0431). These values of 61 and 62 are indicative of the proposed example optical devices capable of exhibiting enhanced linearity compared to a conventional MZI.

Figure 4:
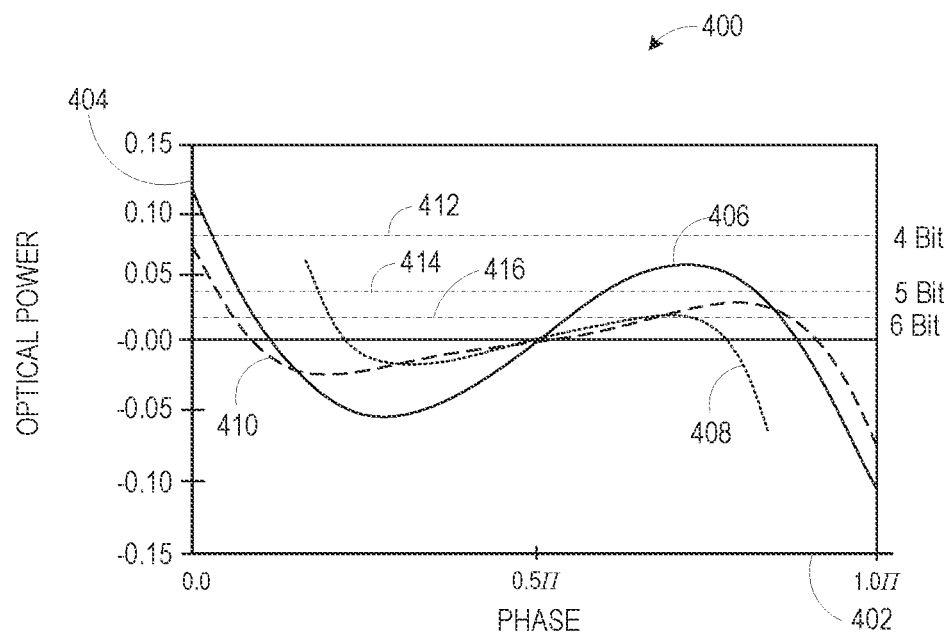
FIG. 4 depicts a graphical representation illustrating bit-precision of the example optical devices a conventional MZI.

Turning now to FIG. 4, a graphical representation 400 showing a comparison of bit-precision among a conventional MZI, the optical device 100 of FIG. 1, and the optical device 200 of FIG. 2 is depicted. In particular, an X-axis 402 represents a phase angle in radians and a Y-axis 404 represents transmission residuals of the linear regression. The term "transmission residual" as used herein may refer to a difference between an optical output of respective MZI and a leaner response (e.g., the linear response 312 plotted in FIGS. 3B-3D).

In the graphical representation 400, a curve 406 (represented with a solid line) depicts the transmission residuals for the conventional MZI which may be representative of a difference between the curves 306 and 312 (see FIG. 3B). Further, a curve 408 (represented with a dotted line) depicts the transmission residuals for the optical device 100 which may be representative of a difference between the curves 308 and 312 (see FIG. 3C), Furthermore, a curve 410 (represented with a dashed line) represents the transmission residuals for the optical device 200 which may be representative of a difference between the curves 310 and 312 (see FIG. 3D). To intuitively compare the transmission residuals 406, 408, and 410, with the least significant bit (LSB) values, a 4-bit LSB, 5-bit LSB, and 6-bit LSB lines are superimposed on the graphical representation 400. The 4-bit LSB, 5-bit LSB, and 6-bit LSB lines are respectively marked with reference numerals 412, 414, and 416. From the graphical representation 400, it is observed that the conventional MZI, the optical device 100, and the optical device 200 respectively provide 4-Bit, 5-Bit, and 6-Bit precision. Except in the marginal regions near "0" and "1" most of the residuals are less than the respective LSB levels. It means the optical device 100 may provide 2 bits more precision (4 times better), and the optical device 200 may provide 1 bit more precision (2 times better) compared to the conventional MZI.

Figure 5:
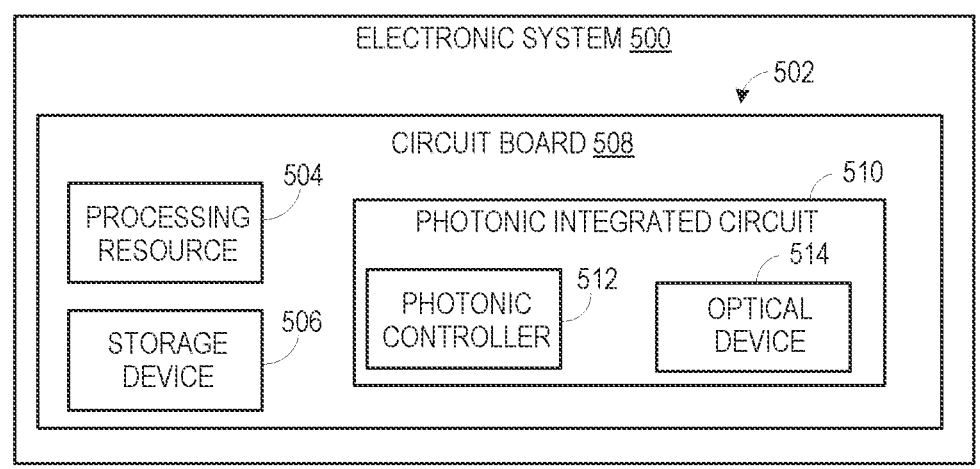
FIG. 5 depicts a block diagram of an example electronic system hosting an example optical device.

Referring now to FIG. 5, a block diagram of an example electronic system 500 is presented. Examples of the electronic system 500 may include, but are not limited to, computers (stationary or portable), servers, storage systems, wireless access points, network switches, routers, docking stations, printers, or scanners. The electronic system 500 may be offered as a stand-alone product, a packaged solution, and can be utilized on a one-time full product/solution purchase or pay-per-use basis. The electronic system 500 may include one or more multi-chip modules, for example, a multi-chip module (MCM) 502 to process and/or store data. In some examples, the MCM 502 may include a processing resource 504 and a storage medium 506 mounted on a circuit board 508. Additionally or alternatively to the processing resource 504 and a storage medium 506, the MCM 502 may host a photonic integrated circuit 510 on the circuit board 508. In some other examples, one or more of the processing resource 504, the storage medium 506, and the photonic integrated circuit 510 may be hosted on separate MCM (not shown). The circuit board 508 may be a printed circuit board (PCB) that includes several electrically conductive traces (not shown) to interconnect the processing resource 504, the storage medium 506, and the photonic integrated circuit 510 with each other and/or with other components disposed on or outside of the PCB.

The processing resource 504 may be a physical device, for example, one or more central processing units (CPUs), one or more semiconductor-based microprocessors, microcontrollers, one or more graphics processing units (GPUs), application-specific integrated circuits (ASICs), a field-programmable gate arrays (FPGAs), other hardware devices, or combinations thereof, capable of retrieving and executing the instructions stored in the storage medium 506. The processing resource 504 may fetch, decode, and execute the instructions stored in the storage medium 506. As an alternative or in addition to executing the instructions, the processing resource 504 may include at least one integrated circuit (IC), control logic, electronic circuits, or combinations thereof that include a number of electronic components. The storage medium 506 may be any electronic, magnetic, optical, or any other physical storage device that contains or stores instructions that are readable and executable by the processing resource 504. Thus, the storage medium 506 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 506 may be a non-transitory storage medium, where the term "non-transitory" does not encompass transitory propagating signals.

Further, in some examples, the photonic integrated circuit 510 may include a photonics controller 512 and one or more photonic devices such as the optical device 514. The optical device 514 may be an example representative of any of the optical device 100 of FIG. 1 or the optical device 200 of FIG. 2. The use of a different number of optical devices or the use of several different types of optical devices in the photonic integrated circuit 510 is also envisioned within the scope of the present disclosure. For example, the photonic integrated circuit 510 may also include other photonic devices such as but not limited to, optical converters, optical cables, waveguides, optical modulators (e.g., ring modulator), optical demodulators (e.g., ring demodulator), resonators, light sources (e.g., lasers), or the like. The photonic integrated circuit 510 may function as a neuromorphic computing unit capable of storing and/or processing data optically. Further, in some examples, the photonic integrated circuit 510 may include several of the optical device 514 arranged to form an optical neural network. The photonics controller 512 may be implemented using an IC chip such as, but not limited to, an ASIC, an FPGA chip, a processor chip (e.g., CPU and/or GPU), a microcontroller, or a special-purpose processor. During the operation of the electronic system 500, the photonics controller 512 may apply signals (e.g., voltages to adjust phase angle changes via phase shifter(s)) to operate the optical device 514.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device comprising:
a Mach-Zehnder interferometer (MZI) comprising a first optical waveguide arm and a second optical waveguide arm; and
a microring resonator (MRR) configured to exhibit a superlinear response in phase change when an optical signal inside the MRR is at resonance, and wherein the MRR is optically coupled to any one of the first optical waveguide arm or the second optical waveguide arm,
wherein the MZI comprises a length difference between the first optical waveguide arm and the second optical waveguide arm thereby achieving a quarter-period phase delay between optical signals of the first optical waveguide arm and the second optical waveguide arm such that a superlinear transmission region of the superlinear response of the MRR is aligned with peaks of an optical output of the MZI to thereby improve linearity of the optical output of the MZI.

2. The optical device of claim 1, wherein the MRR is optically coupled to a shorter one of the first optical waveguide arm and the second optical waveguide arm.

3. The optical device of claim 1, wherein a coupling coefficient between the MRR and the MZI is greater than a normalized optical loss incurred inside the MRR.

4. The optical device of claim 1, wherein the length difference ($\Delta L_{MZI}$) between the first optical waveguide arm and the second optical waveguide arm is set to:

$$\frac{(n_{MRR} + \Delta n_{MRR})2\pi}{\lambda} \times L_r$$

wherein, $\lambda$ is an operating wavelength of the MZI, $n_{MZI}$ is a refractive index of the MZI,
and m is any integer value.

5. The optical device of claim 1, further comprising a phase shifter formed along a portion of the MRR, wherein the phase shifter is configured to receive a voltage and induce a refractive index change ($\Delta n_{MRR}$) in the MRR causing an MRR-induced phase ($\phi_r$) in an optical signal within the MZI.

6. The optical device of claim 5, wherein the MRR-induced phase ($\phi_r$) is equal to $$\frac{(2m+1)\lambda}{4n_{MZI}}$$

wherein, $\lambda$ is an operating wavelength of the MZI, $n_{MRR}$ is a refractive index of the MRR, and $L_r$ is a circumference of the MRR.

7. The optical device of claim 1, wherein the alignment of the superlinear transmission region of the microring resonator with the peaks of the optical output of the MZI causes a standard deviation between the output of the MZI and a linear response to be more than two times lower compared to a standard deviation between an output of a conventional MZI and the linear response.

8. The optical device of claim 1, wherein an improvement in the linearity of the optical output increases a bit precision of the optical device by more than two times compared to a conventional MZI.

9. An optical device comprising:
an MZI comprising a first optical waveguide arm and a second optical waveguide arm; and
an MRR optically coupled to any one of the first optical waveguide arm or the second optical waveguide arm,
wherein the MZI comprises a length difference between the first optical waveguide arm and the second optical waveguide arm, and wherein the length difference is based on an annular length of the MRR such that a superlinear transmission region of the MRR is aligned with peaks of an optical output of the MZI to thereby improve linearity of the optical output of the MZI.

10. The optical device of claim 9, wherein the MRR is optically coupled to a shorter one of the first optical waveguide arm and the second optical waveguide arm.

11. The optical device of claim 9, wherein a coupling coefficient between the MRR and the MZI is greater than a normalized optical loss incurred inside the MRR.

12. The optical device of claim 9, wherein the length difference ($\Delta L_{MZI}$) between the first optical waveguide arm and the second optical waveguide arm is set to half of the annular length of the MRR.

13. The optical device of claim 9, further comprising a first phase shifter formed along a portion of the MRR, wherein the MRR is formed adjacent to the first optical waveguide arm, and wherein the first phase shifter is configured to receive a first voltage and induce a first refractive index change ($\Delta n_{MRR}$) in the MRR causing an MRR-induced phase ($\phi_r$) in an optical signal within the MZI.

14. The optical device of claim 13, wherein the MRR-induced phase ($\phi_r$) caused is equal to $$\frac{(n_{MRR} + \Delta n_{MRR})2\pi}{\lambda} \times L_r$$

wherein, $\lambda$ is an operating wavelength of the MZI, $n_{MRR}$ is a refractive index of the MRR, and $L_r$ is the annular length of the MRR.

15. The optical device of claim 13, further comprising a second phase shifter formed along a portion of the second optical waveguide arm, wherein the second phase shifter is configured to receive a second voltage and to induce a refractive index change ($\Delta n_{MRR}$) in the second optical waveguide arm causing an MZI arm induced phase ($\phi_r$) in the optical signal within the MZI.

16. The optical device of claim 15, wherein the MZI arm induced phase ($\theta$) is equal to $$\frac{(n_{MZI} + \Delta n_{MZI})2\pi}{\lambda} \times \frac{L_r}{2}$$

wherein, $\lambda$ is an operating wavelength of the MZI, $n_{MZI}$ is a refractive index of the MZI, $L_r$ is an annular length of the MRR, and $\Delta n_{MZI}$ is the refractive index change caused by the second voltage applied to the second phase shifter.

17. The optical device of claim 9, wherein the improvement in the linearity of the optical output increases a bit precision of the optical device by more than two times compared to a conventional MZI.

18. The optical device of claim 9, wherein the optical device is implemented in one or more of a computer, a server, a storage system, a wireless access point, a network switch, a router, a docking station, a printer, or a scanner.

19. An electronic system, comprising:
a circuit board; and
a photonic integrated circuit mounted on the circuit board, wherein the photonic integrated circuit comprises an optical device comprising:
an MZI comprising a first optical waveguide arm and a second optical waveguide arm; and
an MRR optically coupled to any one of the first optical waveguide arm or the second optical waveguide arm,
wherein the MZI comprises a length difference between the first optical waveguide arm and the second optical waveguide arm, and wherein the length difference is based on an annular length of the MRR such that a superlinear transmission region of the MRR is aligned with peaks of an optical output of the MZI to thereby improve linearity of the optical output of the MZI.

20. The electronic system of claim 19, wherein the length difference between the first optical waveguide arm and the second optical waveguide arm is set to half of the annular length of the MRR.

* * * * *